United States Patent [19]

Hamel et al.

[11] Patent Number: 5,125,049
[45] Date of Patent: Jun. 23, 1992

[54] MULTIPURPOSE COMPONENT WITH INTEGRATED OPTICS AND DISTRIBUTION NETWORK WITH OPTICAL AMPLIFICATION

[75] Inventors: André Hamel, Lannion; Jean-Claude Simon, Perros Guirec; Jean-Pierre Goedgebuer, Pouilley les Vignes; Henri Porte, Serre les Sapins, all of France

[73] Assignee: French State Represented by the Minister of Post, Telecommunications and Space, France

[21] Appl. No.: 593,090

[22] Filed: Oct. 5, 1990

[30] Foreign Application Priority Data

Oct. 6, 1989 [FR] France ............... 89 13105

[51] Int. Cl.[5] ............... G02B 6/10
[52] U.S. Cl. ............... 385/2; 385/14
[58] Field of Search ............... 350/96.11, 96.12, 96.13, 350/96.14; 370/1–4

[56] References Cited

U.S. PATENT DOCUMENTS

| | | | |
|---|---|---|---|
| 3,923,374 | 12/1975 | Martin | 350/96.14 |
| 3,951,513 | 4/1976 | Masi | 350/96.14 |
| 4,614,408 | 9/1986 | Mir et al. | 350/388 |
| 4,691,984 | 9/1987 | Thaniyavarn | 350/96.14 |
| 4,957,362 | 9/1990 | Peterson | 356/5 |
| 4,966,730 | 10/1990 | Clement et al. | 252/589 |

FOREIGN PATENT DOCUMENTS 0168192 6/1985 European Pat. Off. .
2608869 12/1986 France .
2165115 8/1984 United Kingdom .

OTHER PUBLICATIONS

"Integrated Waveguide Modulator Using a $LiNbO_3$ TE TM Convertor for Electrooptic Coherence Modulation of Light" Journal of Lightwave Technology, vol. 6, No. 6, Jun. 1988, pp. 892–897, H. Porte et al.

Primary Examiner—Frank Gonzalez
Attorney, Agent, or Firm—Hayes, Soloway, Hennessey & Hage

[57] ABSTRACT

A multi-purpose component with integrated optics includes an optical light guide (12) formed on one face of a substrate (10) made of a double refracting material having neutral axes orientated so that one electromagnetic wave extending into the guide (12) is split up into two waves having polarizations perpendicular to each other and along the neutral axes. A power source (18) applies an electric filed perpendicular to the optical light guide (12) and uniformly along the guide (12). Two rectilinear polarizers (20, 22) with polarization directions (d1, d2) parallel to each other are each disposed at one extremity of the guide (12). The component also includes focussing means (24, 26, 28, 30). The component has particular utility for tuneable optical filtering and optical telecommunications.

7 Claims, 4 Drawing Sheets

MULTIPURPOSE COMPONENT WITH INTEGRATED OPTICS AND DISTRIBUTION NETWORK WITH OPTICAL AMPLIFICATION

FIELD OF THE INVENTION

The object of the invention is to provide a multi-purpose component with integrated optics and a distribution network with optical amplification for applying this component. The invention can be used in optical telecommunications applications and more particularly for selective wavelength-tuneable filtering or for coherence modulation.

BACKGROUND OF THE INVENTION

One of the purposes of optical fiber links is to increase the amount of information transmitted on a given support and in particular to increase the number of channels. Multiplexing methods, mainly optical, are currently being developed along these lines. Various components containing integrated optics are required to carry out these multiplexing techniques.

The present invention relates to a multi-purpose component with integrated optics fully adapted to various types of multiplexing.

SUMMARY OF THE INVENTION

One first object of the invention is to allow for the embodiment of an integrated coherence modulator, that is a modulator assigned to the signal which traverses a variable delay.

A further object of the invention is to allow for the embodiment in one fully integrated version of a multiplexing system by modulating an optical delay, such as the one described in the French patent application filed by the French State (represented by the Minister for Telecommunications and Postal Services) on the Dec. 23, 1986 and published under the number 2 608 869.

A further object of the invention is to make it possible to produce an integrated distribution network transmitting a signal modulated by optical delay and comprising various optical amplification stages.

A further object of the invention is to allow for the embodiment of an integrated frequency-tuneable selective filter.

The component of the invention only transmits the signal on one single guide. The propagation of the luminous wave in a double-refracting material introduces a delay between the two components extending along the neutral axes of the material.

This delay may be modulated by electrically varying the birefringence or double refraction of the material.

The choice of an applied continuous electric field also allows for the selective filtering, by means of interference between the components of the luminous wave, of the signal introduced into the component of the invention.

More specifically, the present invention concerns a multi-purpose component with integrated optics including:

an optical light guide formed on one face of a substrate made of a double refracting material having neutral axes orientated so that an electromagnetic wave extending into the guide is split up into two waves having polarizations perpendicular to each other and along the neutral axes;

means to apply an electric field perpendicular to said face of the substrate supporting the optical light guide and uniformly along the optical light guide;

a first rectilinear polarizer disposed at one extremity of the optical light guide;

a second rectilinear polarizer disposed at the other extremity of the guide and exhibiting one polarization direction parallel to that of the first polarizer, and focussing means.

The present invention also concerns a distribution network with optical amplifiers including a multiplexing system introducing optical delays comprising several components conforming to the component described above for creating these delays;

a principal transmission line connected to the multiplexing system;

at least one coupler connecting the principal transmission line to secondary transmission lines;

at least one optical amplifier on one secondary transmission line;

couplers connecting the secondary transmission lines to distribution channels; and each distribution channel comprising a detection system.

BRIEF DESCRIPTION OF THE DRAWINGS

The characteristics and advantages of the invention shall appear more readily from a reading of the following description, given by way of explanation and being in no way restrictive, with reference to the accompanying drawings on which.

DETAILED DESCRIPTION OF THE PREFERRED EMBODIMENTS

Figure 1:
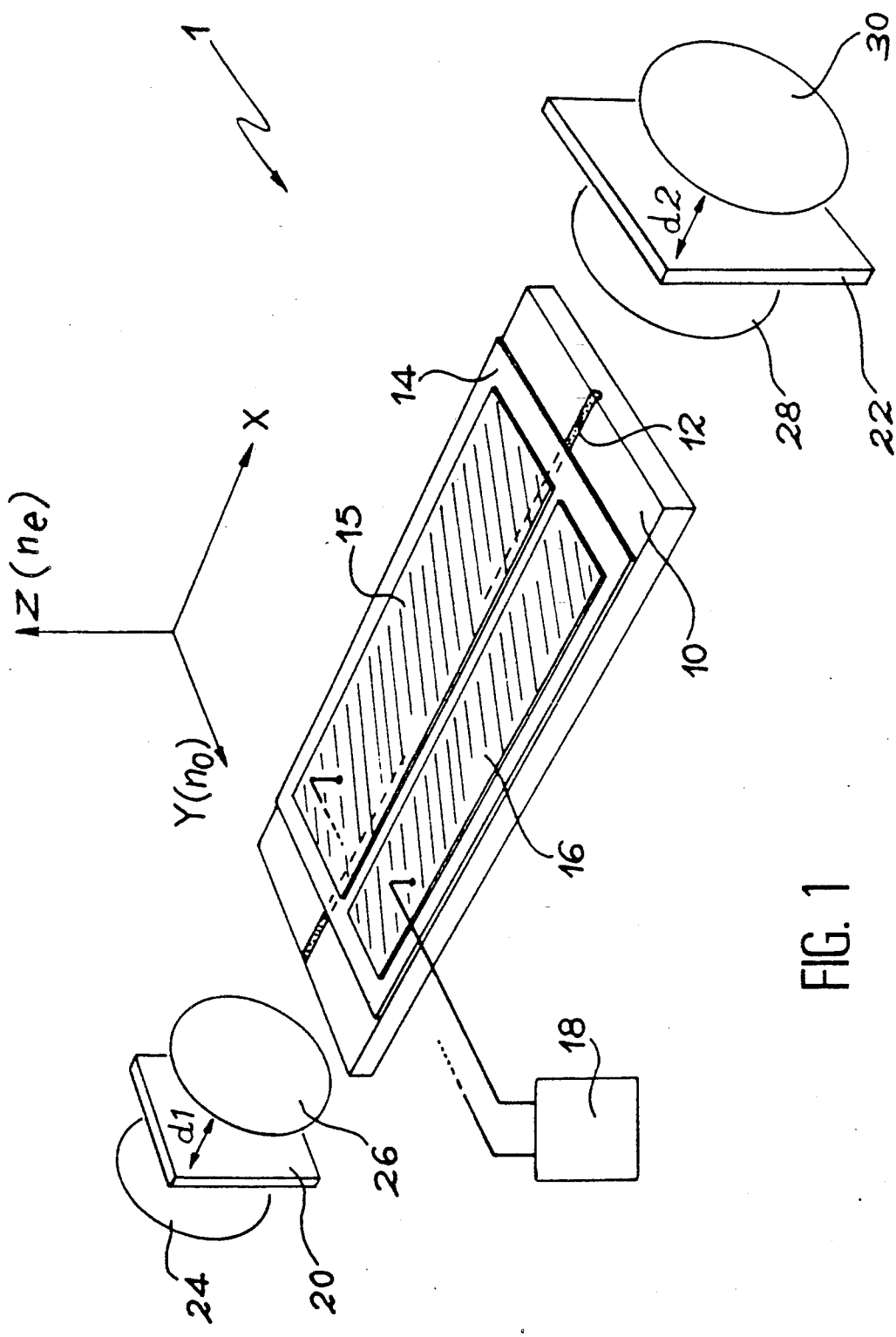
FIG. 1 diagrammatically represents a component according to the invention.

FIG. 1 diagrammatically represents a component according to the invention. This component 1 includes a parallelpiped substrate 10 made of a double refracting material on which an optical light guide 12 is formed. The substrate 10 may, for example, have a thickness of 0.5 mm, a length of several tens of mm and a width of 8 mm.

The guide is embodied by diffusing a metal in the double refracting material. Preferably, this metal may be either titanium (Ti) or magnesium (Mg) or nickel (Ni) or vanadium (Vn) or from other materials. The guide 12 covers the length of the substrate 10 and has a width of 3 micrometers, for example.

The double refracting material is preferably selected from lithium niobate ($LiNbO_3$), lithium tantalate ($LiTaO_3$) of from other materials. This material is cut to size so that an electromagnetic wave extending into the guide is split into two waves having polarizations perpendicular to each other and along the neutral axes of the material.

On the example shown, the double refracting material is LiNbO3 and the neutral axis corresponding to the extraordinary index ne is orientated along an axis Z; the neutral axis corresponding to the ordinary index no is orientated along an axis Y; the propagation of the light in the guide is effected along an axis X. The axis X, Y and Z from one mark of the space.

The face of the substrate 10 on which the guide 12 is formed is coated with a fine dielectric layer 14, such as SiO, having a thickness of about 400 nm.

The dielectric layer 14 is covered by two electrodes 15 and 16 made of aluminium, for example, and having a thickness of about 500 nm. Preferably, these electrodes are rectangular and have a length of 20 mm, for example.

The electrode 15 is disposed so as to cover the guide 12 over its length. With the guide 12 dividing the face of the substrate 10 into two sections, the electrode 15 mostly covers one of the sections and projects over the other by about 6 micrometers.

The other electrode 16 covers another section of the substrate: the space between the electrodes is 7 micrometers, for example.

The electrodes 15 and 16 are connected to an electric power source 18. The unit formed by the dielectric layer 14, the electrodes 15 and 16 and the power unit 18 make it possible to apply an electric field in the substrate 10 perpendicular to the guide 12 and uniformly along the guide 12.

The voltages delivered by the power source 18 amount to about ten volts.

The component 1 also includes a first and a second rectilinear polarizer respectively 20 and 22 disposed at each extremity of the optical light guide 12. These polarizers 20 and 22 exhibit polarization directions d1 and d2 preferably disposed parallel 45° from the axes Y and Z, that is 45° from the neutral axes of the double refracting material (d1 and d2 being symbolized by arrows on FIG. 1).

The component 1 further comprises focusing means 24, 26, 28 and 30 which allow for crossing of the polarizers and a focussing adapted to the introduction of light into the guide 12 or light being introduced into an outgoing fiber (not shown).

The polarizers 20 and 22 and the focusing unit 24, 26, 28 and 30 may also be embodied by optical fibers.

Any polarization luminous beam penetrating into the component 1 is polarized rectilinearly and focused in the optical light guide 12. When extending into the guide 12 and with no electric field being applied, the electromagnetic wave is divided into two waves with polarizations orientated along the neutral axes of the double refracting material and extending at different speeds.

The application of an electric field makes it possible to vary the double refraction of the material and thus to modify the delay between the two waves. The phase shift introduced by the electric field is proportional to its amplitude.

At the guide outlet, the two waves are again polarized parallel.

If the coherence length L of the luminous beam ($L = \lambda^2/\Delta\lambda$; $\lambda$ = wavelength of the luminous beam ; $\Delta\lambda$ = spectral width of the beam) is less than the delay introduced (or rather its equivalent in terms of length, in other words this delay is multiplied by the speed of the light), the two waves shall not interfere with each other at the guide outlet and the information constituted by the period of the delay is preserved.

If the coherence length L of the luminous beam is greater than the introduced delay, the component 1 acts as an interferometer.

There now follows a description on how these two situations may be best exploited.

Figure 2:
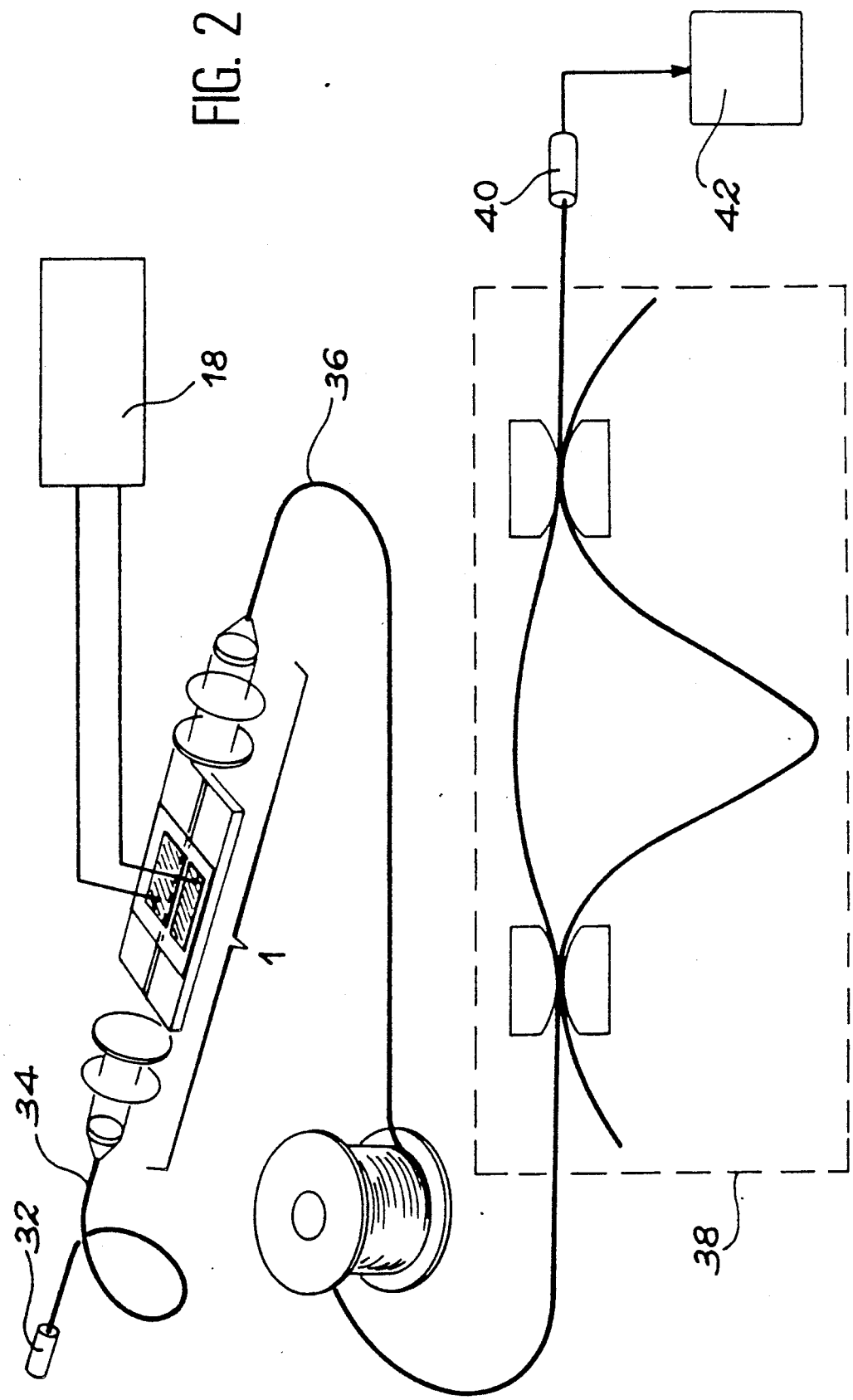
FIG. 2 diagrammatically represents a coherence modulated transmission system including a component according to the invention.

FIG. 2 diagrammatically represents a coherence modulation transmission system including a component according to the invention. By means of an optical fiber 34, a luminous source 32 delivers a luminous beam to the inlet of a component 1, as described earlier. This may, for example, be a laser diode emitting a luminous beam with a wavelength $\lambda = 1300$ nm and a coherence length $Lc = 200$ $\mu$m or a superluminescent diode with a coherence length $Lc = 40$ $\mu$m.

The component 1 acts here as a coherence modulator. In fact, the power source 18 makes it possible to apply a variable electric field introducing variations in the delay between the two waves extending inside the optical light guide. The power source 18 may consist of a video amplifier connected to a video camera (not shown) and whose output voltage is proportional to the signal delivered by the camera. The information contained in this signal is transferred in a delay form by the luminous beam inside a monomode optical fiber 36.

For such a device to function, the delay introduced into the double refracting material needs to be greater than the coherence length L of the luminous beam. In this way, the waves produced in the modulator from the luminous beam do not interfere at the outlet of the modulator.

Demodulation is ensured by a Mach-Zehnder type integrated optical fiber interferometer tuned to the delay introduced by the component 1 where no field is applied.

A HgCdTe type detector photodiode 40 makes it possible to transform the demodulated luminous beam into an electric signal. This signal is amplified by an amplifier 42 and allows for display of the images recorded by the video camera.

This type for carrying information lends itself particularly well to multiplexing and, by means of the component of the invention, makes it possible to construct a multiplexing system of the type described in the previously mentioned French patent published under the number 2 608 869 in the fully integrated version.

Figure 3:
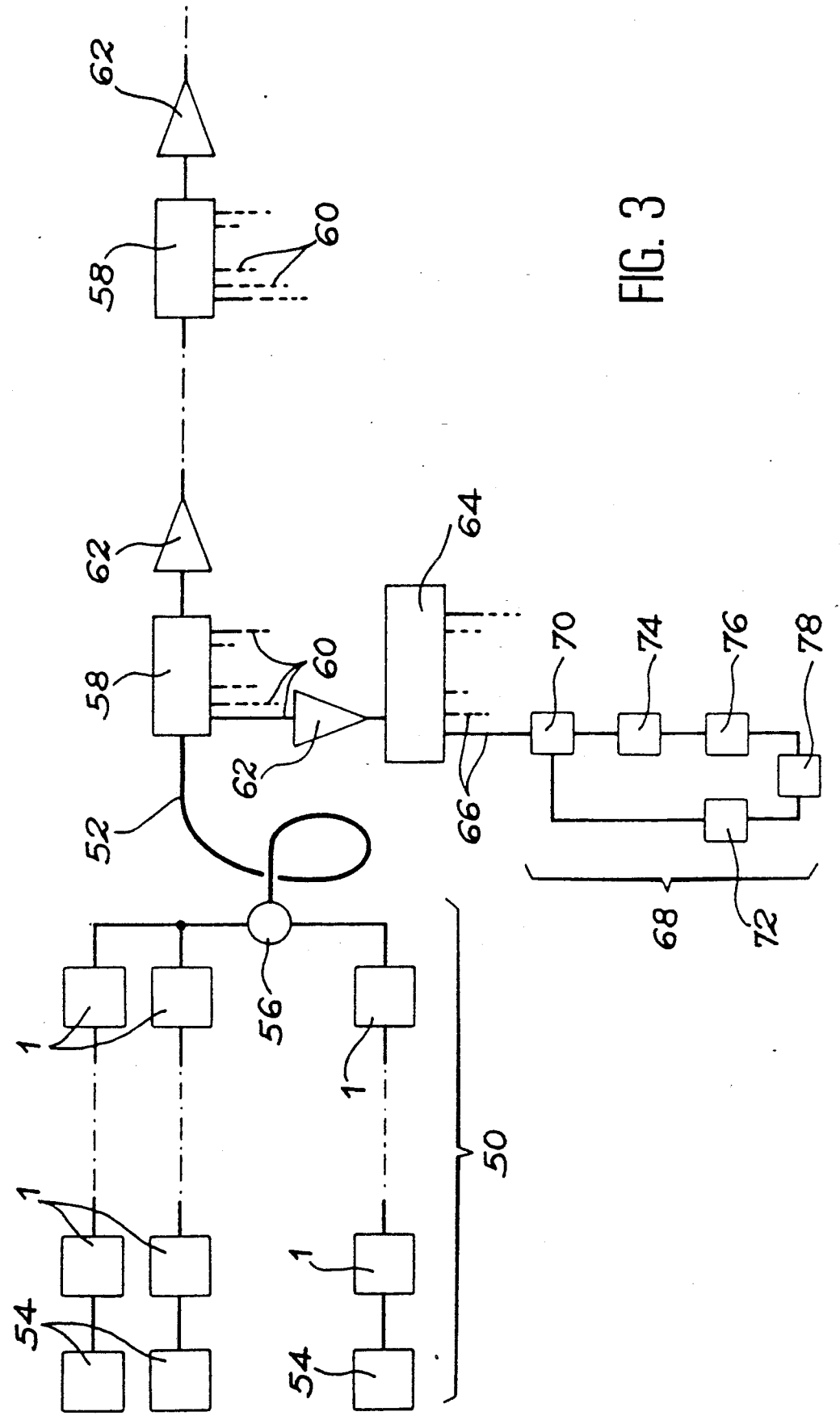
FIG. 3 diagrammatically represents a distribution network according to the invention.

Said component lends itself particularly well to the embodiment of a network for distributing a signal. With reference to FIG. 3, a multiplexing system 50 delivers multiplexed signals on a principal transmission line 52.

The multiplexing system 50 combines a series architecture with a parallel architecture. The system 50 is made up of a set of luminous sources and modulators embodied by components 1 according to the invention allowing for modulation by optical delays of the luminous signals delivered by the sources 54.

The luminous sources 54 may be monomode or multimode laser diodes, electroluminescent diodes or superluminescent diodes or any combination of these various types of sources. The modulators 1 introduce optical delays greater than the coherence lengths of the sources; more generally, such modulators ensure that no modulation of the outgoing luminous intensity appears when the optical delay is modulated by the signal to be transmitted.

The various stages of the system 50 are connected to the inputs of a coupler 56 connected to the principal transmission line 52.

Couplers 58 connected to the transmission line 52 shunt one part of the multiplexed signals to secondary transmission lines 60. The output of each coupler 58 is connected to the input of an optical amplifier 62 whose pass-band is adapted to the signals to be transmitted.

It is possible to use fiber, stimulated Raman effect or other similar amplifiers, semiconductive amplifiers or any other amplifier whose pass-band is sufficient.

Couplers 64 connect the secondary transmission lines to distribution channels 66. In a program transmission system, these channels 66 serve the users. They are connected to detection systems 68 to demultiplex or demodulate the signal transmitted in the distribution channels 66. At its output, each coupler 64 has as many distribution channels 66 as users.

The signals arriving at the input of the detection system are tainted by an intensity noise inherent to the luminous sources used. Considering the information transmitted coded in a delay form and extracted by constructive interference, the noise brought by the source occurs as a multiplicative term of the signals.

The detection system 68 shown on FIG. 3 makes it possible to be freed of the intensity noise generated by the luminous sources and the optical amplifier 62. It includes a device 70 for separating the signal transmitted on the distribution channel 66 to which this signal is connected. This signal is thus divided into one first signal and one second signal. A photodiode type detector 72 delivers an electric signal proportional to the first signal.

The second signal is transmitted to a demodulation device 74, for example a Mach Zehnder type interferometer tuned to the delay introduced by one of the components 1 of the multiplexing system 50. This device 74 is connected to a second photodiode type detector 76 delivering an electric signal proportional to the second demodulated signal.

A divider 78 divides the signal derived from the delivered second detector 76 by the signal delivered by the first detector 72. At the output of the divider 72, a demodulated signal is obtained freed of the noise due to the luminous sources 54 and the optical amplifier 62.

The component of the invention thus provides the function of the selective tuneable integrated filter.

Figure 4:
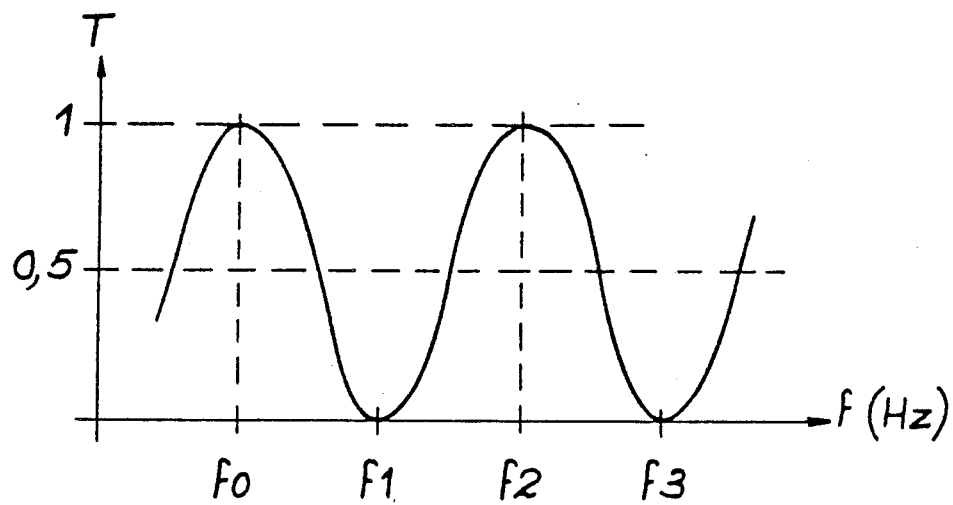
FIG. 4 diagrammatically represents the transmission curve according to the frequency of a component according to the invention.

FIG. 4 diagrammatically represents the transmission curve of a component according to the invention according to the frequency of the guided luminous wave inside the component. When the luminous source associated with the component delivers a luminous beam whose coherence length is greater than the delay introduced at the time of extending the luminous beam inside the optical light guide, the components of the beam polarized along the two neutral axes of the double refracting material interfere at the output of the component, this component constituting an interferometer.

The transmission T of the component then has the aspect of a sinosoid according to the frequency of the luminous beam. The interference is constructive for the frequencies $f_o$, $f_2$, ... and T is 1, whereas they are destructive for the frequencies $f_1$, $f_3$, ... and T is 0. The values of $f_o$, $f_1$, ... depend on the characteristics of the component (double refracting material used, guide length, value of the voltage applied ...).

Only certain frequencies may extend inside the guide: the component in this case is thus a selective filter. The value of these frequencies depends on the electric field applied: the filter is tuneable.

Figure 5:
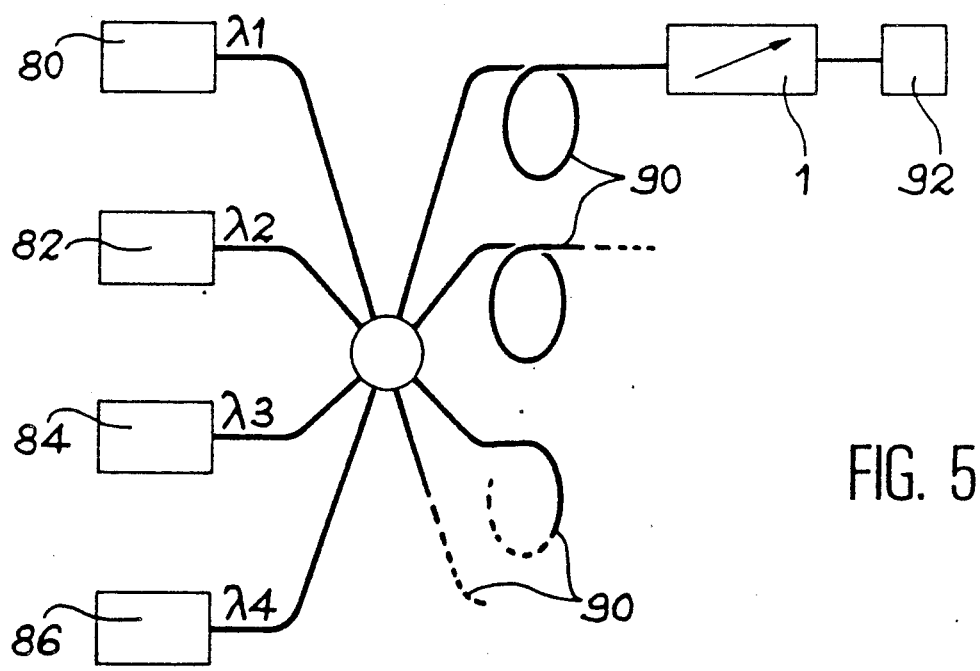
FIG. 5 diagrammatically represents an optical multiplexing and demultiplexing system including the component according to the invention.

FIG. 5 diagrammatically represents a wavelength multiplexing and demultiplexing system including the component of the invention. In this example, only four luminous sources 80, 82, 84 and 86 are represented, but such a device may equally comprise others. The luminous sources 80, 82, 84 and 86 emit luminous beams on different wavelengths, respectively $\lambda 1$, $\lambda 2$, $\lambda 3$ and $\lambda 4$. These luminous beams are delivered onto the inputs of a coupler 88 which multiplexes them and which delivers the multiplexed beams onto the optical transmission fibers 90.

These fibers are connected to demultiplexing systems including a component 1 according to the invention and a photodetector 92.

The luminous beams on the wavelengths $\lambda 1$, $\lambda 2$, $\lambda 3$ and $\lambda 4$ have coherence lengths greater than the delay introduced by the component 1 which here acts as a tuneable selective filter. In fact, depending on the electric field applied, it is possible to select the wavelength which is transmitted by the component and to filter the others. So as to improve the selection of such a device, it is possible to connect in series several components whose transmissions T are all centered on the same wavelength, but whose transmission curve periodicity is double or triple that of the first component.

In the current state of the art, with the aid of a single component, it is possible to separate wavelengths distant by about 0.3 nm.

The preceding descriptions are given solely by way of non-restictive examples. However, a large number of variants is possible without departing from the context of the invention.

What is claimed is:

1. An integrated optical multipurpose component comprising:

a substrate made of a double refracting material having an ordinary axis and an extraordinary axis perpendicular to each other, said substrate comprising a first face and a second opposite and parallel face which are perpendicular to said extraordinary axis, and a first and a second extremity;

a double refracting optical light microguide formed in said first face of said substrate and orientated perpendicularly to said ordinary axis and extending from said first extremity to said second extremity so that a light wave extending into the guide is split up into two waves having polarizations perpendicular to each other and being orientated respectively along said extraordinary and ordinary axes, said microguide having a first and a second end respectively disposed at said first and second extremity so that the propagation of said light wave in the microguide between said first and second end introduces a delay between said two waves;

means for applying an electric field perpendicular to said first face of the substrate and uniformly along the optical light microguide for modifying said delay;

a first rectilinear polarizer disposed at said first extremity and having a determined polarization direction;

a second rectilinear polarizer disposed at said second extremity and exhibiting a polarization direction parallel to the polarization direction of said first rectilinear polarizer; and focussing means disposed at said first and second extremities for focussing said light wave respectively from said first polarizer into said first end and from said second end into said second polarizer.

2. A component according to claim 1, wherein said means for applying an electric field comprises at least one variable component.

3. A component according to claim 1, wherein said means for applying an electric field comprises at least one continuous component.

4. A component according to claim 1, wherein said means for applying an electric filed comprises:
   a first electrode disposed above said first face of said substrate and partially covering said microguide;
   a second electrode disposed above said first face and beside said first electrode; and
   an electric power source connected to said first and second electrodes.

5. A component according to claim 1, further comprising:
   a dielectric layer covering a greater portion of the first face of the substrate;
   a first electrode partially covering said dielectric layer at least above the optical light microguide;
   a second electrode covering another part of the dielectric layer; and
   an electric power source connected to said first and second electrodes, said first and second electrodes and said electric power source constituting said means for applying an electric field.

6. A component according to claim 1, wherein said determined polarization direction of the rectilinear polarizers is 45° from said ordinary and extraordinary axis of the double refracting material.

7. A component according to claim 1, and further comprising a tuneable optical filter for demultiplexing and separating optical waves having different frequencies.

* * * * *